United States Patent
Liljegren

(10) Patent No.: US 9,370,895 B1
(45) Date of Patent: Jun. 21, 2016

(54) MAGNETIC FIELD INDUCTION BONDING TECHNIQUE

(75) Inventor: Edward A. Liljegren, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 699 days.

(21) Appl. No.: 13/427,775

(22) Filed: Mar. 22, 2012

(51) Int. Cl.
*B29C 65/36* (2006.01)

(52) U.S. Cl.
CPC .............. *B29C 65/36* (2013.01); *B29C 65/3604* (2013.01); *B29C 65/3608* (2013.01); *B29C 65/3672* (2013.01); *B29C 65/3676* (2013.01); *B29C 65/368* (2013.01); *B29C 65/3612* (2013.01); *B29C 65/3616* (2013.01); *Y10T 428/25* (2015.01)

(58) Field of Classification Search
CPC ........................... B29C 65/36–65/3616; B29C 65/3672–65/368; B29C 65/3676; B29C 65/3678; Y10T 428/25
USPC ...................................................... 156/272.4
See application file for complete search history.

(56) References Cited

U.S. PATENT DOCUMENTS

| | | | |
|---|---|---|---|
| 3,802,985 A * | 4/1974 | Leatherman | 156/244.25 |
| 4,749,833 A * | 6/1988 | Novorsky et al. | 219/603 |
| 2001/0035406 A1* | 11/2001 | Ryan et al. | 219/634 |
| 2008/0110560 A1* | 5/2008 | Wijk | B29C 66/1122 156/272.4 |
| 2011/0266030 A1 | 11/2011 | Swaminathan et al. | |

OTHER PUBLICATIONS

Ashfaque Hussain Habib et al., "Novel Solder-Magnetic Particle Composites and Their Reflow Using AC Magnetic Fields", Jun. 2010, pp. 2187-2190, IEEE Transactions on Magnetc, vol. 46, No. 6.

* cited by examiner

*Primary Examiner* — Elizabeth A Robinson
(74) *Attorney, Agent, or Firm* — Lowenstein Sandler LLP

(57) ABSTRACT

Methods and systems for reflowing an adhesive are described. The adhesive may be reflowed by applying an alternating magnetic field at a particular frequency selected to be natural resonant frequency resonant of magnetizable material embedded in the adhesive. The alternating magnetic field at the particular frequency resonates the magnetizable material, inductively producing heat. The heat reflows the adhesive.

22 Claims, 7 Drawing Sheets

MAGNETIC FIELD INDUCTION BONDING TECHNIQUE

BACKGROUND OF THE INVENTION

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. Manufacture of these electronic devices may include bonding various structures using an adhesive.

With conventional bonding techniques that use an adhesive, once an adhesive has been used to bond one structure to another, it may not be possible to thereafter separate the bonded structures without causing damage to them. This may result in an ability to rework devices after they have been assembled.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION OF THE PRESENT INVENTION

Adhesives may be used to bond various structures to one another. For example, two substrates may be bonded together using an adhesive. If the adhesive permanently bonds structures together, repair of the bonded structures may be limited to replacing the entire complex of bonded structures. Described herein are embodiments of adhesives used to bond structures that can also be used to separate the structures or otherwise move them with respect to each other without causing damage to the individual structures. Also described herein are embodiments of methods and systems for safely reflowing the adhesive. Although the embodiments may be described at times in regards to substrates, the adhesive and methods described herein may also be used with other types of structures.

In one embodiment, an adhesive, that bonds together substrates, may be composed of a magnetizable material that enables the adhesive be reflowed by applying an alternating magnetic field at a particular frequency selected to be a natural resonant frequency of the magnetizable material. The alternating magnetic field at the particular frequency resonates the magnetizable material, inductively producing heat that reflows the adhesive. The heat is localized to the interface between the substrates and, thus, does not cause damage to surrounding substrates.

Figure 1:
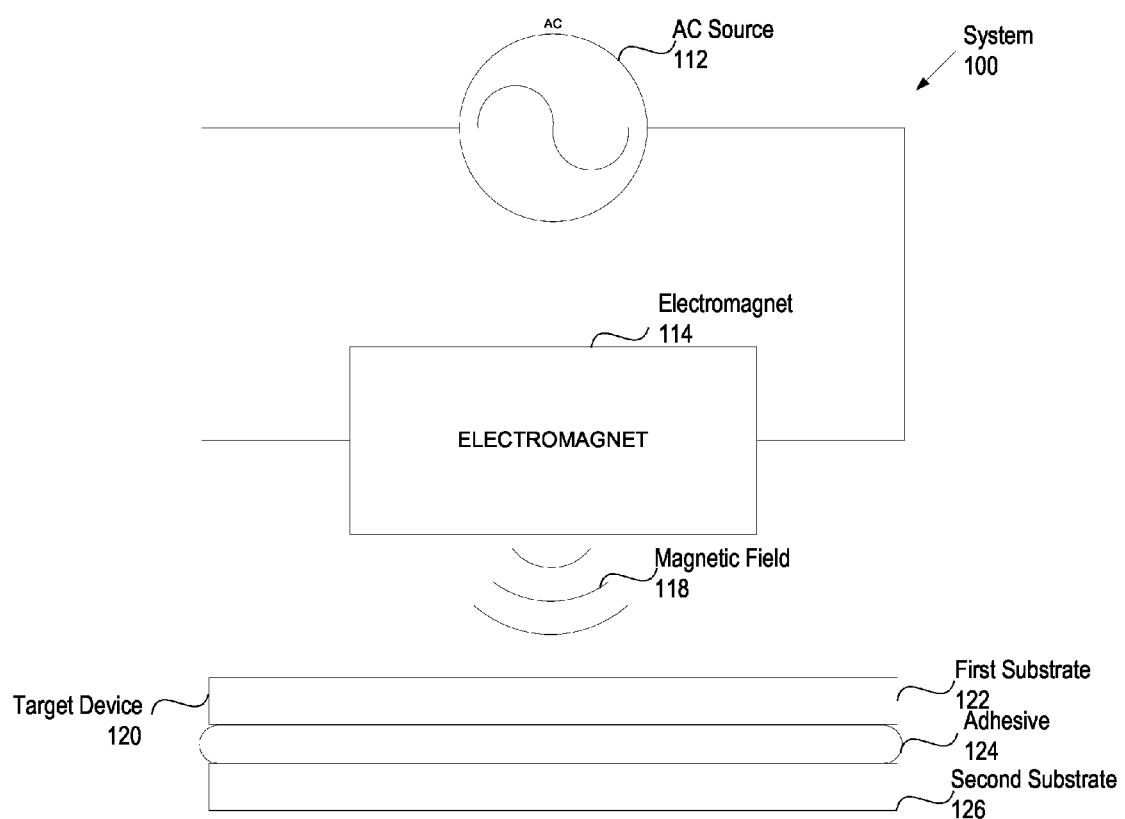
FIG. 1 illustrates an embodiment of a system for reflowing an adhesive.

FIG. 1 illustrates an embodiment of a system 100 for reflowing an adhesive 124 of a target device 120. The target device 120 includes an adhesive 124 disposed between and bonding a first substrate 122 and a second substrate 126. The adhesive 124 is set or cured such that it binds the first substrate 122 and the second substrate 126. The adhesive 124 includes a magnetizable component with a particular resonant frequency and further includes a binder component. Various embodiments of adhesives including a magnetizable component and binder component are described below. In one particular embodiment, the magnetizable component is a ferromagnetic material. Alternatively other types of materials that can be affected by a magnetic field can be used.

When the target device 120 is brought within an alternating magnetic field 118 having a frequency that matches the resonant frequency of the adhesive component, the magnetizable component of the adhesive 124 inductively generates heat. The generated heat causes the binder component of the adhesive 124 to reflow. When the binder component of the adhesive 124 is reflowed, the first substrate 122 and second substrate 126 can be moved with respect to one another. For example, the first substrate 122 and second substrate 126 can be separated from one another or have their relative position adjusted.

The system 100 includes an alternating current (AC) power source 112 coupled to a magnetic field generator 114. The magnetic field generator 114 includes an electromagnet, such as a coil. The AC power source 112 is configured to generate an alternating current at a selected frequency that powers the magnetic field generator 114 and causes the magnetic field generator 114 to generate an alternating magnetic field 118 at the selected frequency. Alternatively, the AC power source 112 and magnetic field generator 114 may be replaced with a DC power source that is configured to generate a direct current at a selected amperage that rotates a permanent magnet at a selected frequency, thereby generating the alternating magnetic field 118 at a specific frequency. By selecting a frequency that matches the resonant frequency of the magnetizable component of the adhesive 124, the system causes the adhesive 124 to reflow as described above.

Figure 2:
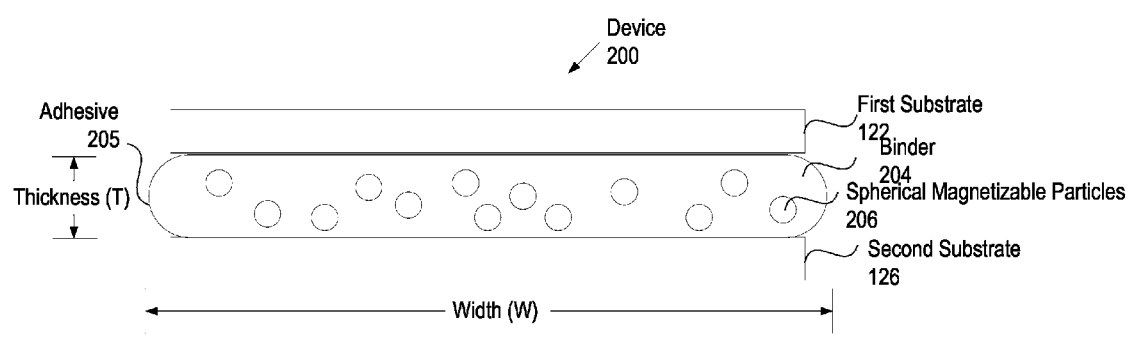
FIG. 2 illustrates an embodiment of a target device including an adhesive with spherical magnetizable particles embedded in a binder.

FIG. 2 illustrates an embodiment of a target device 200 including an adhesive 205 with substantially spherical magnetizable particles 206 embedded in a binder 204. The target device 200 includes a first substrate 122 bonded to a second substrate 126 by the adhesive 205. In one embodiment, for example, the adhesive 205 is applied as a layer between the first substrate 122 and the second substrate 126. The adhesive 205 has a width (W) and a thickness (T) and the width may be substantially greater than the thickness. For example, in one embodiment, the width is at least ten times greater than the thickness. The adhesive 205 may have a width that causes the adhesive 205 to substantially cover the entire surface of the second substrate 126. Alternatively, the adhesive 205 may be disposed on only a portion of the second substrate 126. For example, the adhesive may be disposed on approximately 90% or more of the second substrate 126. As another example, the adhesive 205 may be disposed on approximately 10% or less of the second substrate 126. The adhesive may have any appropriate thickness for bonding the first substrate 122 to the second substrate 126. In one embodiment, for example, the adhesive 205 may be approximately 0.01 mm thick. Alternatively, the adhesive 205 may have other thicknesses. It should be understood that the adhesive 205 is not necessarily drawn to scale with respect to the first substrate 122 and second substrate 126.

The adhesive 205 includes substantially spherical magnetizable particles 206 embedded in a binder 204. In one embodiment, the spherical magnetizable particles 206 are uniformly distributed throughout the binder 204. In one embodiment, the spherical magnetizable particles 206 are approximately 10 percent or less, by weight, of the adhesive 205. Alternatively, the spherical magnetizable particles 206 may be more or less than 10 percent, by weight, of the adhesive 205 and may have a non-uniform distribution throughout the binder.

The adhesive 205 is formed by mixing the binder 204 with the spherical magnetizable particles 206. The adhesive 205 may be formed by liquefying the binder 204 by heating the binder 204 with a heat source, adding the spherical magnetizable particles 206 to the liquid binder, and mixing the composition until the spherical magnetizable particles 206 are uniformly distributed throughout the binder 204. Alternatively, the adhesive 205 may be formed by adding the spherical magnetizable particles 206 to the binder 204 when the binder 204 is still solid. In one embodiment, the adhesive 205 is formed by mixing the spherical magnetizable particles 206 with pieces of solid binder 204 and applying an alternating magnetic field at the resonant frequency of the spherical magnetizable particles 206. The alternating magnetic field may inductively heat the spherical magnetizable particles 206 causing the binder 204 to liquefy. Then, the liquid binder 204 and spherical magnetizable particles 206 are mixed until the spherical magnetizable particles 206 are uniformly distributed throughout the binder 204. In another embodiment, the adhesive is formed by adding the spherical magnetizable particles 206 to a solid mass of binder 204 and applying an alternating magnetic field at the resonant frequency of the spherical magnetizable particles 206 while agitating the binder 204. The alternating magnetic field inductively heats the spherical magnetizable particles 206 causing the portion of the binder 204 in contact with the spherical magnetizable particles 206 to liquefy. As the binder 204 is agitated, the spherical magnetizable particles 206 may continue to liquefy portions of the binder 204, dispersing the spherical magnetizable particles 206 throughout the binder 204. The process is continued until the binder 204 is fully liquefied and the spherical magnetizable particles 206 are uniformly distributed throughout the binder 204. The adhesive 205 may be applied while the binder 204 is liquefied or the adhesive 205 may be allowed to solidify for later application.

The binder 204 may be a heat reflow adhesive, such as a thermoplastic adhesive. In one embodiment, the binder 204 may be a very high bond (VHB) adhesive. In another embodiment, the binder 204 may include a thermobonded film (TBF). In one embodiment, the binder 204 may include multiple components, including both adhesive and non-adhesive components mixed together.

The spherical magnetizable particles 206 are composed of a ferromagnetic material, such as an anisotropic ferrous material. In one embodiment, for example, the spherical magnetizable particles 206 may be at least partly composed of iron, an iron compound, or an iron alloy. In one embodiment, for example, the spherical magnetizable particles 206 may be at least partly composed of nickel or gadolinium. In one embodiment, the spherical magnetizable particles 206 may be at least partly composed of a rare-earth magnet, a samarium-cobalt magnet, a neodymium magnet, or another magnet. The spherical magnetizable particles 206 may be hollow or solid. The spherical magnetizable particles 206 are of a substantially uniform size and have a magnetic resonant frequency that is dependent on the size of the particles 206. In one embodiment, the spherical magnetizable particles 206 have a diameter of approximately 4-12 nanometers. In another embodiment, the spherical magnetic particles 206 have a diameter of approximately 5 micrometers. It should be understood that the spherical magnetizable particles 206 are not necessarily drawn to scale with respect to the binder 204 or any other component of the target device 200.

In one embodiment, the binder 204 is electrically insulating. Although the spherical magnetizable particles 206 may be electrically conductive, they may be present in a sufficiently low amount such that the adhesive 205 remains electrically insulating. Alternatively, the spherical magnetizable particles 206 may render the adhesive 205 electrically conductive even though the binder 204 is electrically insulating. In another embodiment, the binder 204 is electrically conductive and, therefore, the adhesive 205 is electrically conductive.

To reflow the adhesive 205, the target device 200 is brought within an alternating magnetic field at the resonant frequency of the spherical magnetizable particles 206. Alternatively, the alternating magnetic field may be established after the target device 200 is positioned to be within an area that would be within the magnetic field when generated. The alternating magnetic field may be applied by, e.g., the system 100 of FIG. 1. When the alternating magnetic field is applied to the target device 200 at the resonant frequency of the spherical magnetizable particles 206, the spherical magnetizable particles 206 inductively generate heat. In one embodiment, for example, the spherical magnetic particles 206 are approximately 5 micrometers in diameter and the resonant frequency is approximately 9.37 GHz. It may be noted that the amount of heat generated is generally proportional to the size of the spherical magnetizable particles 206. The generated heat causes the binder 204 to reflow. When the binder 204 is reflowed, the first substrate 122 and second substrate 126 may be moved with respect to one another. For example, the first substrate 122 and second substrate 126 may be separated from one another or have their relative position adjusted. As another example, the first substrate 122 or second substrate 126 may be replaced with a new substrate. When the alternating magnetic field is turned off or the target device 200 is otherwise removed from the field, the heat dissipates and the binder 204 resolidifies. When the binder 204 resolidifies, the adhesive 205 binds the first substrate 122 to the second substrate 126. The adhesive 205 can be again reflowed by reapplying an alternating magnetic field at the resonant frequency of the spherical magnetizable particles 206.

In one embodiment, the selective reflow nature of the adhesive 205 may be used by a manufacturer of the target device 200 to conceal proprietary information, such as a proprietary circuitry design. In one embodiment, the proprietary information is disposed between the first substrate 122 and the second substrate 126 and the adhesive 205 is disposed around (as viewed from above) the information. Without knowing that the adhesive 205 could be reflowed by applying an alternating magnetic field at a particular frequency, an unauthorized individual could only reflow the adhesive by applying heat to the entire target device 200, potentially damaging the information and/or other components of the target device 200. However, an authorized individual could reflow the adhesive 205 by applying an alternating magnetic field at the resonant frequency of the adhesive 205 and access the information. For example, an authorized repair agent may be informed of the reflow nature of the adhesive 205 and the magnetic resonant frequency of the adhesive 205 to allow the authorized agent to repair a proprietary circuit.

Figure 3:
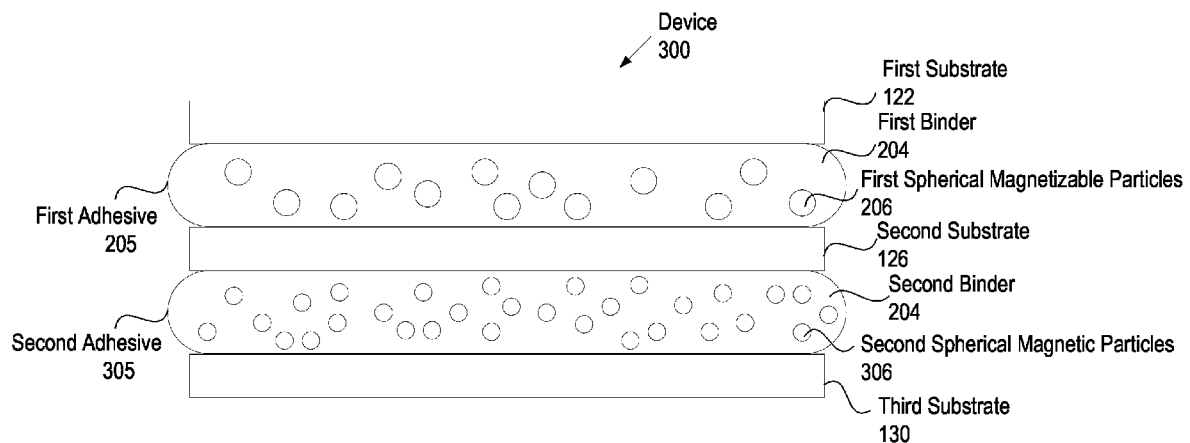
FIG. 3 illustrates an embodiment of a target device including a first adhesive with a first magnetic resonant frequency and a second adhesive with a second magnetic resonant frequency.

FIG. 3 illustrates an embodiment of a target device 300 including a first adhesive 205 with a first magnetic resonant frequency and a second adhesive 305 with a second magnetic resonant frequency. Like the target device 200 of FIG. 2, the target device 300 includes a first substrate 122 bonded to a second substrate 126 by an adhesive 205 (denoted the first adhesive 205 in FIG. 3). The target device 300 differs from the target device 200 of FIG. 2 in that it also includes a third substrate 130 bonded to the second substrate 126 by a second adhesive 305.

In one embodiment, the first substrate 122 is an optically transparent layer, such as plastic or glass, the second substrate 126 is a midframe and the third substrate 130 is a base substrate. In one embodiment, the second substrate 126 is a midframe that is relatively inflexible and infrangible as compared to, for example, internal circuitry of the target device. Thus, as a midframe, the second substrate 126 can provide the target device with additional strength, support, sturdiness, or stability. Any of the substrates, in one embodiment, may be glass, plastic, silicon, or metal. Thus, in one embodiment, one or more of the substrates may be non-metallic. Alternatively, the substrates may be other types of structures and have other types of properties or be made of other types of materials.

The second adhesive 305 is similar to the first adhesive 205, described above with respect to FIG. 2, in that the second adhesive 305 includes a binder 204 and spherical magnetizable particles 306. However, the spherical magnetizable particles 306 in the second adhesive 305 differ from the spherical magnetizable particles 206 in the first adhesive 205 in that they are of a different size and, thus, have a different magnetic resonant frequency. In particular, the first adhesive 205 includes first spherical magnetizable particles 206 having a first magnetic resonant frequency and the second adhesive 305 includes second spherical magnetizable particles 306 having a different, second magnetic resonant frequency.

To reflow the first adhesive 205, the target device 300 is brought within an alternating magnetic field at the first magnetic resonant frequency. To reflow the second adhesive 305, the target device 300 is brought within an alternating magnetic field at the second magnetic resonant frequency. The first magnetic resonant frequency and the second magnetic resonant frequency may be sufficiently different such that application of an alternating magnetic field at the first magnetic resonant frequency does not reflow the second adhesive 305 and application of alternating magnetic field at the second magnetic resonant frequency does not reflow the first adhesive 205. Thus, by selecting the frequency of the alternating magnetic field, a user can select which of the adhesives to reflow.

The second substrate 130 may be composed of glass or another heat insulating material that prevents the heat generated by the first spherical magnetizable particles 206 from reflowing the second adhesive 305. Alternatively, in another embodiment, the second substrate 130 may be composed of metal or another heat-conducting material. In such an embodiment, the target device 300 may include a heat insulating layer (not shown) adjacent to the second substrate 126 or otherwise disposed between the first adhesive 205 and second adhesive 305 to prevent the heat generated by the first spherical magnetizable particles 206 from reflowing the second adhesive 300 and vice versa.

As mentioned above, the first adhesive 205 may be electrically conductive. Thus, the first adhesive 205 may electrically couple the first substrate 122 and second substrate 126. To avoid electrically coupling the first substrate 122 and second substrate 126 with the first adhesive 205, the target device 300 may include one or more passivation layers (not shown) disposed between the first substrate 122 and the second substrate 126. A first passivation layer may be disposed between the first substrate 122 and the first adhesive 205. A second passivation layer may be disposed between the first adhesive 205 and the second substrate 126 in addition to or instead of the first passivation layer. In one embodiment, the second passivation layer may also function as a heat insulating layer. Similarly, the second adhesive 305 may be electrically conductive and the target device 300 may include one or more passivation layers disposed between the second substrate 126 and the third substrate 130.

Figure 4:
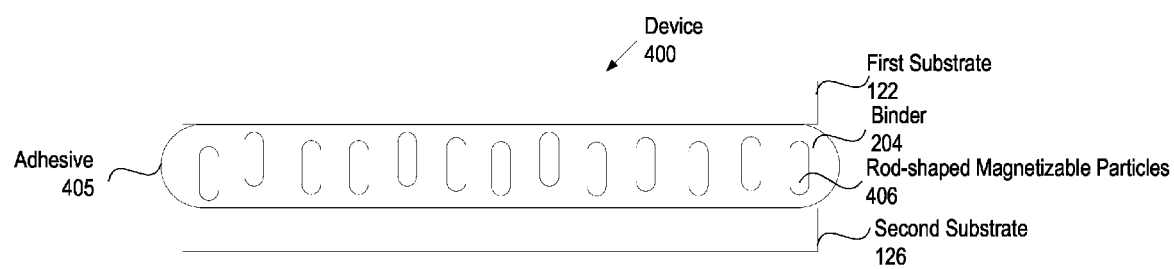
FIG. 4 illustrates an embodiment of a target device including an adhesive with rod-shaped magnetizable particles embedded in a binder.

FIG. 4 illustrates an embodiment of a target device 400 including an adhesive 405 with rod-shaped magnetizable particles 406 embedded in a binder 204. Like the target device 200 of FIG. 2, the target device 400 includes a first substrate 122 bonded to a second substrate 126 by the adhesive 405. The adhesive 405 is substantially similar to the adhesive 205 of FIG. 2 except that it includes rod-shaped magnetizable particles 406 rather than spherical magnetizable particles 206. In one embodiment, the rod-shaped magnetizable particles 406 are uniformly distributed throughout the binder 204 with a substantially uniform orientation.

Like the spherical magnetizable particles 206 described with respect to FIG. 2, the rod-shaped magnetizable particles 406 may have a magnetic resonant frequency that is dependent on the size of the particles 406. However, unlike the spherical magnetizable particles 206, the magnetic resonant frequency of the rod-shaped magnetizable particles 406 may also depend on the orientation of the particles 406 with respect to an applied magnetic field. For example, the rod-shaped magnetizable particles 406 may have a first magnetic resonant frequency in a first orientation and a different, second magnetic resonant frequency in a second orientation.

The rod-shaped magnetizable particles 406 may be composed of the same materials described above with respect to the spherical magnetizable particles 206 and may be present in the binder 204 in similar proportions. In one embodiment, the rod-shaped magnetizable particles 406 have a length of approximately 20 nanometers and a width of approximately 2 nanometers. Alternatively, the rod-shaped magnetizable particles 406 may be longer or shorter and may be wider or thinner. It should be understood that the rod-shaped magnetizable particles 406 are not necessarily drawn to scale with respect to the other components of the target device 400.

The adhesive 405 may be formed in a similar manner to that described above with respect to the adhesive 205 of FIG. 2 with the addition of the application of a constant magnetic field to orient the rod-shaped magnetizable particles. For example, the adhesive 405 may be formed by liquefying the binder 204 by heating the binder 204 with a heat source, adding the rod-shaped magnetizable particles 406 to the liquid binder, and mixing the composition until the rod-shaped magnetizable particles 406 are uniformly distributed throughout the binder 204. While the binder 204 is still liquefied, a constant magnetic field may be applied to orient the rod-shaped magnetizable particles 406. As another example, inductive heat generated by the rod-shaped magnetizable particles 406 may be used to heat the binder 204 as described above.

To reflow the adhesive 405, the target device 400 brought within an alternating magnetic field at the orientation-specific resonant frequency of the rod-shaped magnetizable particles 406. The alternating magnetic field may be applied by, e.g., the system 100 of FIG. 1. When the target device 400 is brought within the alternating magnetic field at the orientation-specific resonant frequency of the rod-shaped magnetizable particles 406, the rod-shaped magnetizable particles 306 inductively generate heat, causing the binder 204 to reflow. As described above, when the binder 204 is reflowed, the first substrate 122 and second substrate 126 may be moved with respect to one another.

If the applied magnetic field lacks a constant component, the rod-shaped magnetizable particles 406 may become disoriented when the binder 204 is liquefied. Thus, when the binder 204 resolidifies, the rod-shaped magnetizable particles 406 may not be substantially uniformly oriented. Thus, unlike the adhesive 205 of FIG. 2, further attempts to reflow the adhesive 405 by applying an alternating magnetic field may be unsuccessful. This may advantageously allow a user to reflow the adhesive 405, yet allow the adhesive 405 to bond in a non-reflowable state. However, if the magnetic field applied to reflow the adhesive 405 includes a properly oriented constant component, the rod-shaped magnetizable particles may maintain their orientation when the binder 204 is liquefied. Thus, when the binder 204 resolidifies, the rod-shaped magnetizable particles 406 may still be substantially uniformly oriented. Thus, like the adhesive 205 of FIG. 2, the adhesive 405 can be again reflowed by reapplying an alternating magnetic field at the orientation-specific resonant frequency of the rod-shaped magnetizable particles 406. By selecting whether or not the magnetic field applied to the target device 400 to reflow the adhesive 405 includes or lacks a constant component, a user can select whether or not the adhesive 405 bonds in a reflowable or non-reflowable state.

In one embodiment, the adhesive 405 is reflowed in an alternating magnetic field without a constant component after a quality inspection test has been passed, permanently binding the first substrate 122 and second substrate 126 when the adhesive resolidifies. This embodiment may not include moving the first substrate 122 with respect to the second substrate 126.

Figure 5:
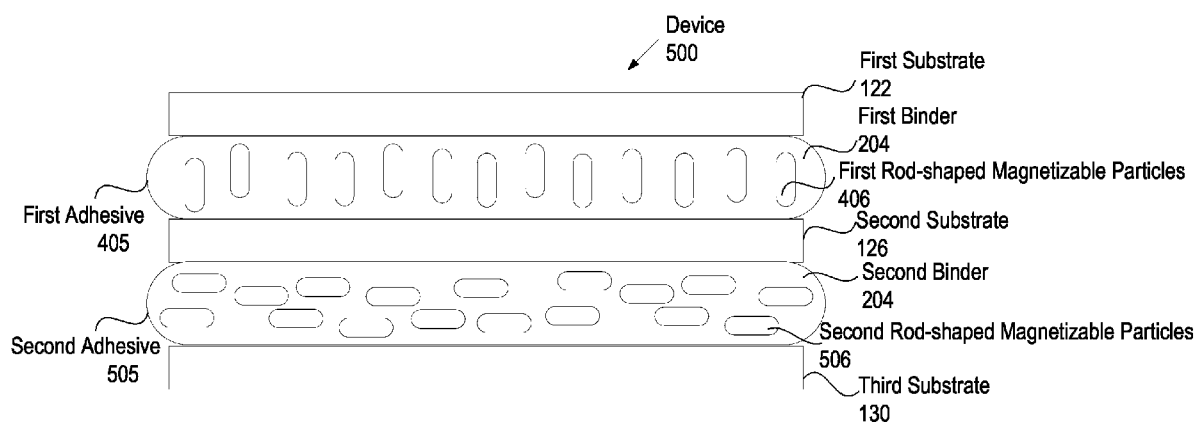
FIG. 5 illustrates an embodiment of a target device including a first adhesive layer with a first magnetic orientation and a second adhesive layer with a second magnetic orientation.

FIG. 5 illustrates an embodiment of a target device 500 including a first adhesive layer 405 with a first magnetic orientation and a second adhesive layer 505 with a second magnetic orientation. Like the target device 300 of FIG. 3, the target device 500 includes a first substrate 122 bonded to a second substrate 126 by the first adhesive 405 and further includes a third substrate 130 bonded to the second substrate 126 by the second adhesive 505.

The second adhesive 505 is similar to the first adhesive 405, described above with respect to FIG. 4, in that the second adhesive 505 includes a binder 204 and rod-shaped magnetizable particles 506. However, the rod-shaped magnetizable particles 506 in the second adhesive 505 different from the rod-shaped magnetizable particles 406 in the first adhesive 405 in that they are oriented in a different orientation. In particular, the first adhesive 405 includes first rod-shaped magnetizable particles 406 oriented in a first orientation and the second adhesive 505 includes second rod-shaped magnetizable particles 506 oriented in a second orientation. In one embodiment, the first orientation is perpendicular to the second orientation. In one embodiment, the first rod-shaped magnetizable particles 406 may have a magnetic resonant frequency in the first orientation and the second rod-shaped magnetizable particles 506 may have the same magnetic resonant frequency, but in the second orientation.

To reflow the first adhesive 405, the target device 500 is brought within an alternating magnetic field having the first orientation at the magnetic resonant frequency of the first rod-shaped magnetizable particles 406 in the first orientation. To reflow the second adhesive 505, the target device 500 is brought within an alternating magnetic field having the second orientation at the magnetic resonant frequency of the second rod-shaped magnetizable particles 506 in the second orientation. As noted above, in one embodiment, the magnetic resonant frequency of the first rod-shaped magnetizable particles 406 in the first orientation and the magnetic resonant frequency of the second rod-shaped magnetizable particles 506 in the second orientation may be the same. Thus, by selecting the orientation of the alternating magnetic field, but using the same resonant frequency, a user can select which of the adhesives to reflow.

Figure 6:
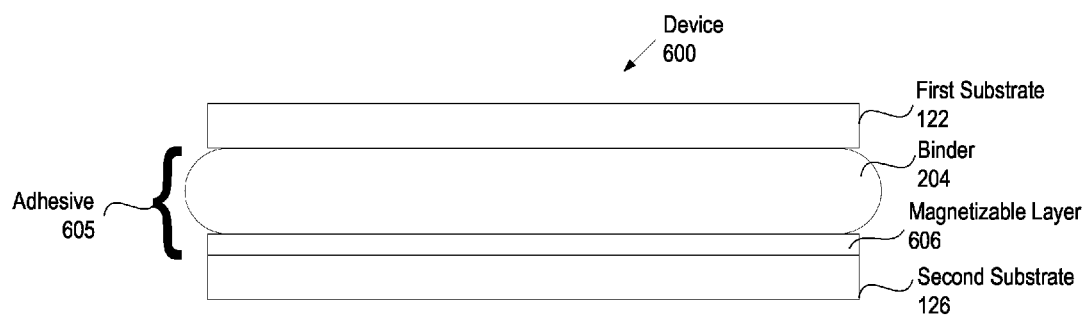
FIG. 6 illustrates an embodiment of a target device including an adhesive with a magnetizable layer adjacent to a binder layer.

FIG. 6 illustrates an embodiment of a target device 600 including an adhesive 605 with a magnetizable layer adjacent 606 to a binder 204. Like the target device 200 of FIG. 2, the target device 600 includes a first substrate 122 bonded to a second substrate 126 by the adhesive 605. The adhesive 605 includes a magnetizable layer 606 adjacent to the binder 204. Although FIG. 4 illustrates the magnetizable layer 606 adjacent to the second substrate 126, in another embodiment, the magnetizable layer 606 is disposed between the binder 204 and the first substrate 122.

The magnetizable layer 606 may be composed of the same materials described above with respect to the spherical magnetizable particles 206. In one embodiment, the magnetizable layer 406 has a thickness of approximately 50 micrometers.

The magnetizable layer 606 may have a magnetic resonant frequency that depends on the size and shape of the layer 606. To reflow the adhesive 605, in particular, the binder 204, the target device 600 is brought within an alternating magnetic field at the resonant frequency of the magnetizable layer 606, which causes the magnetizable layer 606 to inductively generate heat, reflowing the binder 204. As described above, when the binder 204 is reflowed, the first substrate 122 and second substrate 126 may be moved with respect to one another. When the binder 204 resolidifies, the adhesive 605 binds the first substrate 122 to the second substrate 126. The adhesive 605 can be again reflowed by reapplying an alternating magnetic field at the resonant frequency of the magnetizable layer 606.

Figure 7:
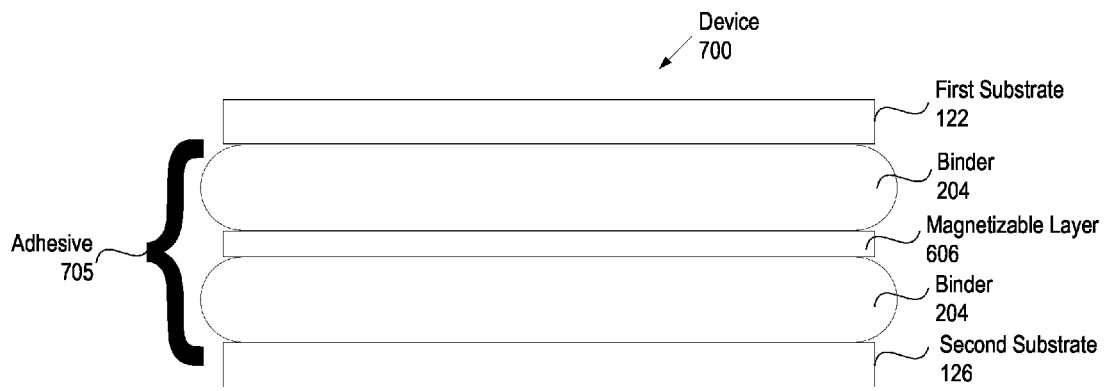
FIG. 7 illustrates an embodiment of a target device including an adhesive with a magnetizable layer between two binder layers.

FIG. 7 illustrates an embodiment of a target device 700 including an adhesive 705 with a magnetizable layer 606 between two layers of binder 204. Like the target device 600 of FIG. 6, the target device 700 includes a first substrate 122 bonded to a second substrate 126 by the adhesive 705, which includes a magnetizable layer 606 and binder 204. However, unlike the target device 600 of FIG. 6, the magnetizable layer 606 in the device 700 of FIG. 7 is disposed between two layers of binder 204 rather than between binder 204 and a substrate.

As described above, to reflow the adhesive 705, the target device 700 is brought within an alternating magnetic field at the resonant frequency of the magnetizable layer 606. When the binder 204 resolidifies, the adhesive 705 binds the first substrate 122 to the second substrate 126. The adhesive 705 can be again reflowed by reapplying an alternating magnetic field at the resonant frequency of the magnetizable layer 606. In another embodiment, when the binder 204 is reflowed, the magnetizable layer 606 is removed. Thus, when the binder 204 resolidifies, further attempts to reflow the adhesive 705 by applying an alternating magnetic field may be unsuccessful. By selecting whether or not to remove the magnetizable layer 606, a user can select whether or not the adhesive 705 bonds in a reflowable or non-reflowable state.

In one embodiment, the adhesive 705 is reflowed after a quality inspection test has been passed and the magnetizable layer 606 is removed, permanently binding the first substrate 122 and second substrate 126 when the adhesive 705 resolidifies. This embodiment may not include moving the first substrate 122 with respect to the second substrate 126.

Figure 8:
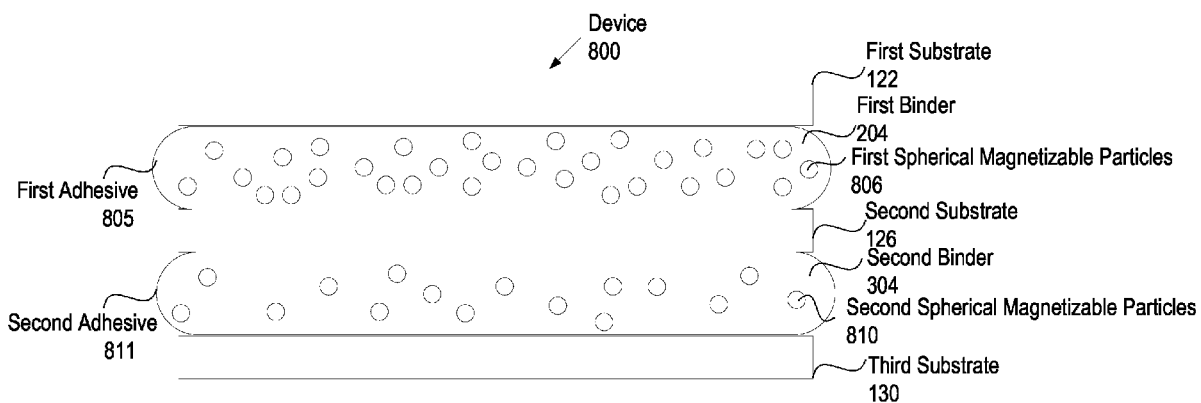
FIG. 8 illustrates an embodiment of a target device including a first adhesive with a first magnetizable particle concentration and a second adhesive with a second magnetizable particle concentration.

FIG. 8 illustrates an embodiment of a target device 800 including a first adhesive 805 with a first magnetizable particle concentration and a second adhesive 811 with a second magnetizable particle concentration. Like the target device 300 of FIG. 3, the target device 800 includes a first substrate 122 bonded to a second substrate 126 by the first adhesive 805 and further includes a third substrate 130 bonded to the second substrate 126 by the second adhesive 811.

The first adhesive 805 and second adhesive 811 may be similar to the adhesive 205 of FIG. 2 in that each adhesive includes a binder 204 and 304 and spherical magnetizable particles 806 and 810. In particular, the first adhesive 805 includes a first binder 204 and first spherical magnetizable particles 806 and the second adhesive 811 includes a second binder 304 and second spherical magnetizable particles 810. In another embodiment, not illustrated, the first adhesive 805 and second adhesive 811 may be similar to the adhesive 305 of FIG. 3 in that each adhesive includes rod-shaped magnetizable particles in a particular orientation rather than spherical magnetizable particles of a particular size. The first adhesive 805 and second adhesive 811 both include spherical magnetizable particles having the same size and the same magnetic resonant frequency. The first adhesive 805 and second adhesive 811 differ from each other in that they each include a different concentration of magnetizable particles. In particular, the first adhesive 805 includes first magnetizable particles 806 in a first concentration and the second adhesive 811 includes second magnetizable particles 810 in a second concentration. In one embodiment, the first concentration is larger than the second concentration. Alternatively, the first concentration may be less than the second concentration. For example, in one embodiment, the first concentration is approximately 10% by weight and the second concentration is approximately 5% by weight. In other embodiments, the concentrations may be different.

To reflow the first adhesive 805, the target device 800 is brought within an alternating magnetic field at the magnetic resonant frequency. The alternating magnetic field may be applied at a magnitude sufficient to reflow the first adhesive 805, but insufficient to reflow the second adhesive 811. Alternatively, the alternating magnetic field may be applied for an amount of time sufficient to reflow the first adhesive 805, but insufficient to reflow the second adhesive 811. To reflow the second adhesive 811, the target device 800 is brought within an alternating magnetic field at the magnetic resonant frequency at a magnitude or for a time sufficient to reflow the second adhesive 811. If the first concentration is higher than the second concentration, reflowing the second adhesive 811 may also reflow the first adhesive 805. Thus, by selecting the magnitude of the alternating magnetic field or the amount of time the alternating magnetic field is applied, a user can select whether to reflow both the first adhesive 805 and the second adhesive 811 or to only reflow the first adhesive 805.

Figure 9:
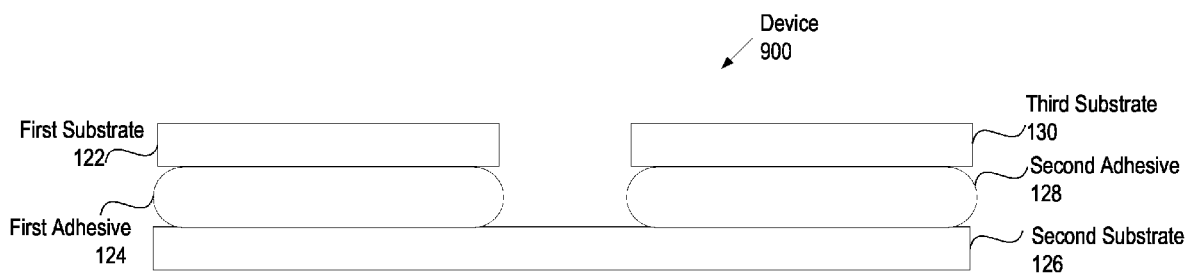
FIG. 9 illustrates an embodiment of a target device including a first adhesive layer adjacent to a second adhesive layer.

FIG. 9 illustrates an embodiment of a target device 900 including a first adhesive layer 124 adjacent to a second adhesive layer 128. Like the target device 300 of FIG. 3, the target device 900 includes a first substrate 122 bonded to a second substrate 126 by the first adhesive layer 124 and further includes a third substrate 130 bonded to the second substrate 126 by the second adhesive layer 128. However, unlike the target device 300 of FIG. 3, the first substrate 122 and third substrate 120 are disposed on the same side of the second substrate 126.

The first adhesive layer 124 and second adhesive layer 128 may be similar to the first adhesive 205 and second adhesive 305 of FIG. 3, the first adhesive 405 and second adhesive 505 of FIG. 5, or the first adhesive 805 and second adhesive 811 of FIG. 8. To reflow the first adhesive 124, the target device 900 is brought within an alternating magnetic field at a first magnetic resonant frequency, a first orientation, or a first magnitude. To reflow the second adhesive 128, the target device 900 is brought within an alternating magnetic field at a second magnetic resonant frequency, a second orientation, or a second magnitude. Thus, by selecting the frequency, orientation, or magnitude of the alternating magnetic field, a user can select which of the adhesives to reflow.

The second substrate 126 may be composed of glass or another heat insulating material that prevents the heat generated by reflowing the first adhesive 124 from reflowing the second adhesive 128. In another embodiment, the second substrate 126 may be composed of metal or another heat conducting material. In such an embodiment, the target device 900 may include a heat insulating layer (not shown) between the first adhesive 124 and the second substrate 126, between the second adhesive 128 and the second substrate 126, or both to prevent the heat generated by reflowing the first adhesive 124 from reflowing the second adhesive 128 and vice versa.

Figure 10:
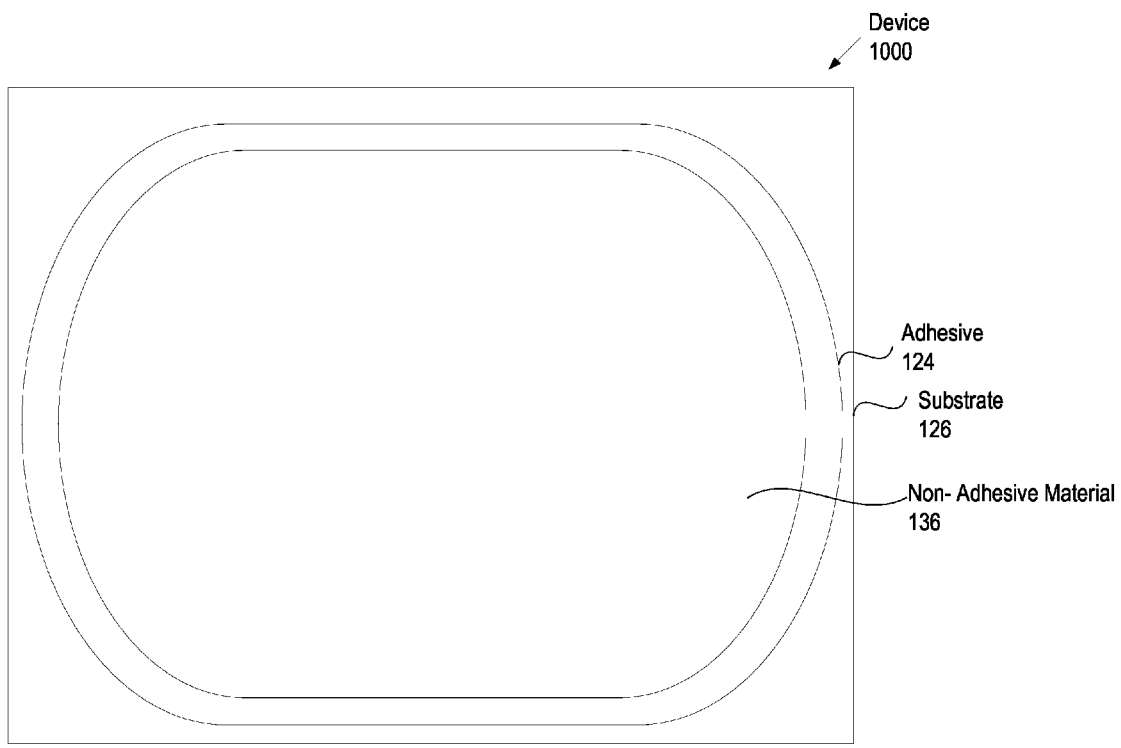
FIG. 10 illustrates a flow diagram of an embodiment of a method of reflowing an adhesive.

FIG. 10 illustrates an embodiment of a target device 1000 including an adhesive 124 disposed on an outer surface area of a substrate 126. In one embodiment, the adhesive 124 is disposed as a closed shape within an outer surface area of the substrate 126. Alternatively, the adhesive 124 may be disposed in an open shape or other arrangement within the outer surface area of the substrate. The target device 900 further includes a non-adhesive material 136 disposed within an inner surface area of the substrate 126. In one embodiment, the adhesive 124 surrounds the non-adhesive material 136.

In one embodiment, the inner surface area is the portion of the substrate closest to the center of the substrate. For example, in one embodiment, the inner surface area is the half of the substrate closest to the center of the substrate and the outer surface area is the half of the substrate furthest from the center of the substrate. Alternatively, in one embodiment, the outer surface area is the portion of the substrate closest to an outer edge of the substrate. For example, in one embodiment, the outer surface area is the half of the substrate closest to an outer edge of the substrate and the inner surface area is the half of the substrate furthest from the outer edge of the substrate. In another embodiment, the inner surface area and outer surface area are each less than half of the substrate. For example, the inner surface area may be the inner quarter of the substrate and the outer surface area may be the outer quarter of the substrate.

The non-adhesive material 136 may also be electrically insulating. Alternatively, at least a portion of the non-adhesive material 136 may be electrically conductive. The non-adhesive material may include air, insulating gel, an oxide, or any other non-adhesive substrate.

Figure 11:
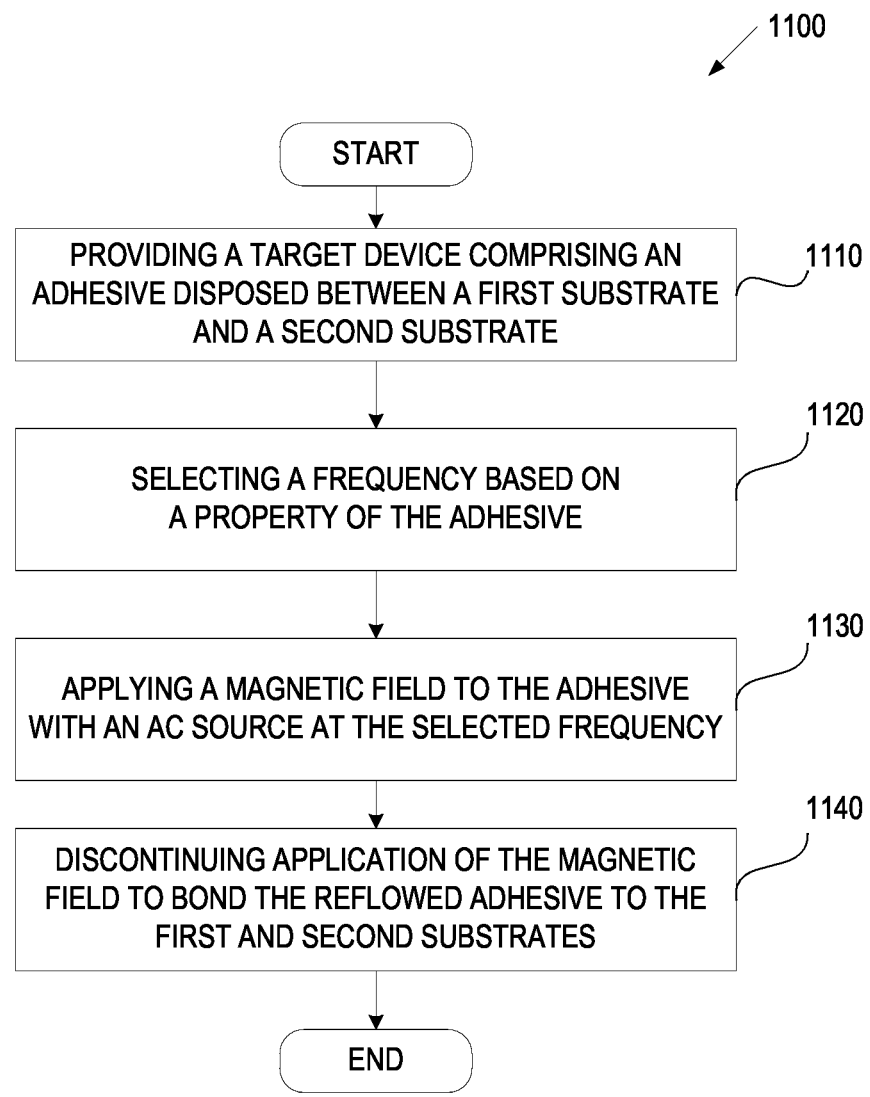
FIG. 11 illustrates a flow diagram of an embodiment of a method of reflowing an adhesive.

FIG. 11 illustrates a flow diagram of an embodiment of a method 1100 of reflowing an adhesive. First, a target device is provided (block 1110). The target device includes an adhesive disposed between and bonding a first substrate and a second substrate. The adhesive includes a magnetizable material and a binder. In some embodiments, the magnetizable material may be composed of iron. Alternatively, as described above, for example, other magnetizable materials may be used. The magnetizable material includes magnetizable particles suspended in the binder. In some embodiments, the magnetizable particles may be substantially spherical or rod-shaped and may be uniformly distributed throughout the binder. Alternatively, the magnetizable particles may have other shapes and non uniform distribution throughout the binder. The adhesive may include a magnetizable layer adjacent to a binder layer.

Next, a frequency is selected based on a property of the adhesive (block 1120). The frequency is selected to be a frequency that, when applied, vibrates the magnetizable material. Vibration of the magnetizable material produces heat and the heat reflows the adhesive layer. The frequency may be selected based on at least one of the size, shape, orientation, and composition of the magnetizable material. As mentioned above, the adhesive may include magnetizable particles suspended in a binder. Thus, the frequency may be selected based on at least one of the size (including the radius, length, and volume), shape, orientation, density, and composition of the magnetizable particles. The frequency may also be selected based on properties of the binder, such as the composition, density, or heat conductivity. The frequency may also be selected based on temperature. The frequency may also be determined empirically or via a look-up derived from empirical research.

Next, a magnetic field is applied to the target device (block 1130). The magnetic field may be applied using an alternating current (AC) source at a frequency selected to reflow the adhesive. The magnetic field may be an alternating magnetic field at a magnetic resonant frequency of the adhesive. Applying the magnetic field to the target device may include selecting a frequency of the alternating magnetic field based on a magnetic resonant frequency of an adhesive from a plurality of frequencies based on a plurality of magnetic resonant frequencies of a plurality of adhesives. Application of the magnetic field may also include selecting an orientation of the magnetic field based on an orientation of magnetizable particles in the adhesive. The application of the magnetic field resonates the magnetizable material, vibrating the magnetizable material to produce heat that reflows the adhesive. For example, the heat may reflow a binder component of the adhesive. The heat is localized to the interface between the substrates and, thus, does not cause damage to surrounding substrates.

In one embodiment, application of the magnetic field to the target device may include inducing a magnetic field, then moving the target device into the induced magnetic field. In another embodiment, application of the magnetic field to the target device may include positioning the target device in a target location and inducing the magnetic field at the target location.

The application of the magnetic field is discontinued (block 1140). Between application of the magnetic field and discontinuing application of the magnetic field, the first substrate may be moved with respect to the second substrate. For example, the first substrate and second substrate may be separated from one another or have their relative position adjusted. In one embodiment, the first substrate is removed from the target device and replaced with another substrate.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A device comprising:
   a first substrate;
   a second substrate;
   a first adhesive layer disposed between and bonding the first substrate and the second substrate, wherein the first adhesive layer comprises a first binder and first magnetizable particles of a first size, the first magnetizable particles to vibrate and generate heat when a first magnetic field oscillating at a first frequency is applied, the first magnetizable particles comprising at least one of iron, cobalt, nickel, or gadolinium;
   a third substrate; and
   a second adhesive layer disposed between and bonding the second substrate and the third substrate, wherein the second adhesive layer comprises a second binder and second magnetizable particles of a second size, wherein the second size is different from the first size, the second magnetizable particles to vibrate and generate heat when a second magnetic field oscillating at a second frequency is applied, wherein the second frequency is different from the first frequency.

2. The device of claim 1, wherein the first magnetizable particles to resonate when the first magnetic field is applied, generating heat and reflowing the first adhesive layer.

3. The device of claim 1, wherein the first adhesive layer comprises the first magnetizable particles suspended in the first binder.

4. The device of claim 3, wherein the magnetizable particles are substantially spherical.

5. The device of claim 3, wherein the first binder comprises at least one of a heat reflow adhesive, a thermoplastic adhesive, a very high bond adhesive, and a thermobonded film.

6. The device of claim 3, wherein the first binder is electrically insulating.

7. The device of claim 1, wherein the first substrate and the second substrate are non-metallic.

8. The device of claim 1, wherein the first adhesive layer is disposed on substantially an entire surface of the second substrate.

9. The device of claim 1, wherein the first adhesive layer is disposed on an outer surface area of the second substrate and the device further comprises a non-adhesive material disposed on an inner surface area of the second substrate.

10. A device comprising:
    a first substrate;
    a second substrate;
    a first adhesive layer disposed between and bonding the first substrate and the second substrate, wherein the first adhesive layer comprises first magnetizable particles of a first size, the first magnetizable particles comprising at least one of iron, cobalt, nickel, or gadolinium;

a third substrate; and a second adhesive layer disposed between and bonding the second substrate and the third substrate, wherein the second adhesive layer comprises second magnetizable particles of a second size, wherein the second size is different from the first size.

11. The device of claim 10, wherein the first magnetizable particles to vibrate and generate heat when a first magnetic field oscillating at a first frequency is applied, wherein the second magnetizable particles to vibrate and generate heat when a second magnetic field oscillating at a second frequency is applied, and wherein the second frequency is different from the first frequency.

12. The device of claim 10, wherein the first magnetizable particles are substantially spherical and the second magnetizable particles are substantially spherical.

13. The device of claim 12, wherein the first magnetizable particles have a first diameter of approximately 4-12 micrometers and the second magnetizable particles have a second diameter of 4-12 micrometers.

14. A device comprising:

a first substrate;

a second substrate;

a first adhesive layer disposed between and bonding the first substrate and the second substrate, wherein the first adhesive layer comprises first magnetizable particles of a first size, the first magnetizable particles to generate heat when a first magnetic field is applied, the first magnetizable particles comprising a ferromagnetic material;

a third substrate; and a second adhesive layer disposed between and bonding the second substrate and the third substrate, wherein the second adhesive layer comprises second magnetizable particles of a second size, wherein the second size is different from the first size, the second magnetizable particles to generate heat when a second magnetic field is applied, wherein the first magnetic field is different from the second magnetic field.

15. The device of claim 14, wherein the first magnetizable particles to vibrate when the first magnetic field is applied at a first frequency, wherein the second magnetizable particles to vibrate when the second magnetic field is applied at a second frequency, wherein the second frequency is different from the first frequency.

16. The device of claim 15, wherein the first magnetizable particles are substantially spherical and the second magnetizable particles are substantially spherical.

17. The device of claim 14, wherein the first adhesive layer comprises the first magnetizable particles in a first concentration and the second adhesive layer comprises the second magnetizable particles in a second concentration.

18. The device of claim 14, wherein the first adhesive layer further comprises an adhesive binder.

19. The device of claim 18, wherein the adhesive binder comprises at least one of a heat reflow adhesive or a thermoplastic adhesive.

20. The device of claim 14, wherein the first adhesive layer is electrically insulating.

21. The device of claim 14, further comprising an isolative layer to electrically isolate the first substrate and the second substrate.

22. The device of claim 14, wherein the first substrate and the third substrate are on a same side of the second substrate.

\* \* \* \* \*